US012790495B2

(12) United States Patent
Mergenthaler et al.

(10) Patent No.: US 12,790,495 B2
(45) Date of Patent: Nov. 10, 2026

(54) PROCESS FOR PRODUCING CARBON BLACK AND RELATED FURNACE REACTOR

(71) Applicant: ORION ENGINEERED CARBONS GMBH, Eschborn (DE)

(72) Inventors: Pieter Mergenthaler, Cologne (DE); Arndt Schinkel, Marienhausen (DE); George Tsatsaronis, Berlin (DE)

(73) Assignee: ORION ENGINEERED CARBONS GMBH, Eschborn (DE)

( * ) Notice: Subject to any disclaimer, the term of this patent is extended or adjusted under 35 U.S.C. 154(b) by 853 days.

(21) Appl. No.: 17/621,953

(22) PCT Filed: Jun. 23, 2020

(86) PCT No.: PCT/EP2020/067474

§ 371 (c)(1),
(2) Date: Dec. 22, 2021

(87) PCT Pub. No.: WO2020/260266

PCT Pub. Date: Dec. 30, 2020

(65) Prior Publication Data

US 2022/0259436 A1 Aug. 18, 2022

(30) Foreign Application Priority Data

Jun. 25, 2019 (EP) .................................... 19182328

(51) Int. Cl.
*C09C 1/50* (2006.01)
*B60C 1/00* (2006.01)
*C08K 3/04* (2006.01)

(52) U.S. Cl.
CPC .............. *C09C 1/50* (2013.01); *B60C 1/0016* (2013.01); *C01P 2006/12* (2013.01); *C08K 3/04* (2013.01)

(58) Field of Classification Search
CPC .......... C09C 1/50; C08K 3/04; B60C 1/0016; C01P 2006/12
See application file for complete search history.

(56) References Cited

U.S. PATENT DOCUMENTS 5,254,325 A 10/1993 Yamasaki et al.
2008/0219915 A1* 9/2008 Quitmann ................. C09C 1/52 422/150
2008/0226538 A1* 9/2008 Rumpf ...................... C09C 1/50 423/458
2016/0002470 A1* 1/2016 Unrau ....................... C09C 1/50 423/451
2016/0255686 A1 9/2016 Zanbaghi
2016/0355686 A1 12/2016 Dikan et al.

FOREIGN PATENT DOCUMENTS

| | | | |
|---|---|---|---|
| EP | 0546008 | B1 | 6/1995 |
| EP | 0792920 | A1 | 9/1997 |
| EP | 0982378 | A1 | 3/2000 |
| EP | 0608892 | B1 | 5/2000 |
| EP | 0754735 | B1 | 3/2001 |
| EP | 1078959 | B1 | 3/2002 |
| EP | 1529818 | A1 | 5/2005 |
| EP | 1233042 | B1 | 11/2010 |
| EP | 1489145 | B1 | 1/2012 |
| EP | 2479223 | A1 | 7/2012 |
| EP | 2563864 | A2 | 3/2013 |
| EP | 3060609 | A1 | 8/2016 |
| EP | 2361954 | B1 | 10/2018 |
| FR | 2653775 | A1 | 5/1991 |
| JP | 2001240768 | A1 | 9/2001 |
| WO | 2013015368 | A1 | 1/2013 |
| WO | 2016030495 | A1 | 3/2016 |
| WO | 2018165483 | A1 | 9/2018 |

OTHER PUBLICATIONS

International Search Report and Written Opinion for corresponding PCT/EP2020/067474, issued Jul. 17, 2020.
Mann, Markus et al., Flow heater for process heat up to 1,200 C, Heat Processing, Feb. 2016.

* cited by examiner

*Primary Examiner* — Stuart L Hendrickson
(74) *Attorney, Agent, or Firm* — Timothy H. Van Dyke; Wolter Van Dyke Davis, PLLC

(57) ABSTRACT

Suggested is a process for obtaining a carbon black composition preferably of low porosity, comprising or consisting of the following steps: (A) subjecting a hydrocarbon raw material into a high temperature combustion gas stream in order to achieve thermochemical decomposition, (B) cooling the reaction gases and (C) recovering of the carbon black thus obtained, wherein said combustion gas stream consists of at least one oxidant and at least one fuel component, and at least a part of said oxidant and/or said fuel component is subjected to an electrical pre-heating step before it is introduced into the pre-combustion chamber to form a high temperature combustion gas stream.

15 Claims, 2 Drawing Sheets

PROCESS FOR PRODUCING CARBON BLACK AND RELATED FURNACE REACTOR

CROSS-REFERENCE TO RELATED APPLICATION

Figure 1:
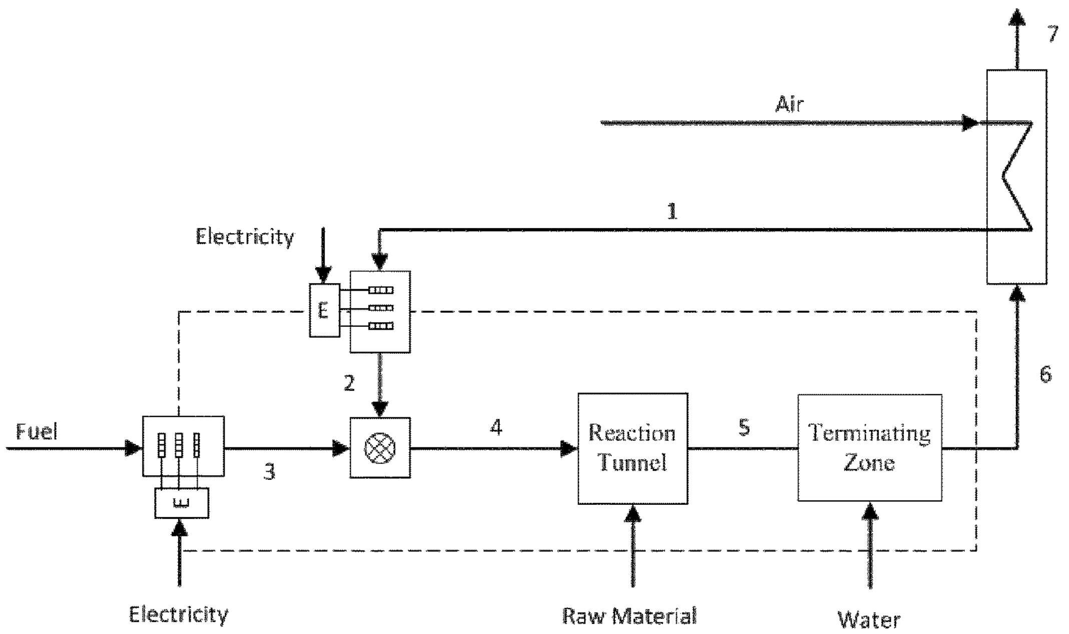

This application is a national stage entry of and claims priority to PCT/EP2020/067474, titled A PROCESS FOR PRODUCING CARBON BLACK AND RELATED FURNACE REACTOR, filed Jun. 23, 2020 and claims priority to EP Application No. 19182328.5 filed on Jun. 25, 2019, which are hereby incorporated by reference in their entireties.

AREA OF INVENTION

The present invention refers to the area of carbon blacks and covers a process for producing it, a carbon black of low porosity, its use and a furnace reactor to obtain the products.

BACKGROUND OF THE INVENTION

Carbon black is the state-of-the-art reinforcing material in rubber compositions. Due to its morphology, such as specific surface area and structure, various physical properties of end products, such as wear performance, rolling resistance, heat built-up, and tear resistance of tires are affected. The wear performance is particularly important for bus and truck tires, where the tires have to deal with very heavy loads. In truck or bus tread compounds finely dispersed carbon black particles are necessary for achieving a very high level of wear performance. Carbon black is also widely used as pigment. Due to its color and electrical conductivity it is part of many applications such as coatings, inks and paints as well as plastic materials.

RELEVANT PRIOR ART

From the state of the art a multitude of processes for producing carbon blacks (also called furnace blacks) with different properties are known; for example:

EP 0754735 B1 (DEGUSSA) discloses an improved carbon black and a process for producing them. The improved carbon blacks distinguished from conventional blacks having the same CTAB surface, after incorporation into SSBR/BR rubber compositions, by a lower rolling resistance with equal or better wet skid behavior. They can be produced in conventional carbon black reactors by conducting the burning in the combustion chamber so that carbon nuclei form and are immediately brought into contact with the carbon black raw material.

EP 1078959 B1 (EVONIK) refers to a furnace carbon black which has a hydrogen (H) content of greater than 4000 ppm and a peak integral ratio of non-conjugated H atoms to aromatic and graphitic H atoms of less than 1.22. The furnace carbon black produced by injecting the liquid carbon black raw material and the gaseous carbon black raw material at the same point in a furnace process.

EP1233042 B1 (DEGUSSA) refers to carbon black with a CTAB surface area from about 10 to 35 m2/g and DBP absorption from about 40 to 180 ml/100 g, the ΔD50 value being at least 340 nm. The carbon black may be produced in a furnace-black reactor from a liquid carbon black raw material and gaseous carbon black material injected into a constriction in the reactor. Compared to other forms of carbon black, the respective products have advantageous properties, such as improved dispersibility, and may be economically and conveniently used in rubber mixtures, particularly in those used to produce extrusion profiles.

EP 1489145 B1 (EVONIK) suggests a process for the production of furnace black by producing a stream of hot combustion gases in a combustion chamber, feeding the hot combustion gases along a flow axis from the combustion chamber through a reactor narrow point into a reaction zone, mixing carbon black raw material into the flow of the combustion gases in front of, inside or behind the reactor narrow point and stopping carbon black formation downstream in the reaction zone by spraying in water, steam being jetted in axially through the gas burner and optionally at the radial oil nozzles and beaded carbon black being introduced before and/or after the reactor narrow point.

EP 2361954 B1 (EVONIK) relates to a carbon black with a CTAB surface area of from 20 to 49 m2/g, with a COAN greater than 90 ml/(100 g), and with a sum of OAN and COAN greater than 235 ml/(100 g). The carbon black is produced in a furnace reactor, where from 20 to 55 percent by weight of the feedstock used for the carbon black are introduced radially through a nozzle within the first third of the reaction zone, and the remaining amount of the feedstock used for the carbon black is introduced through a nozzle upstream at least one further point into the reactor. The carbon black can be used in rubber mixtures.

EP 2479223 A1 (EVONIK) describes a method for producing furnace black in a furnace black reactor comprising a combustion zone along a reactor axis, a reaction zone and a termination zone, comprises producing a stream of hot exhaust gas in the combustion zone by completely burning a fuel in an oxygen-containing gas, passing the exhaust gas from the combustion zone through the reaction zone into the termination zone, mixing a carbon black raw material into the hot exhaust gas into the reaction zone, and stopping the reaction between carbon black and the hot exhaust gases in the termination zone by spraying water.

EP 2563864 A1 (BIRLA) discloses a reactor for manufacturing carbon black, said reactor comprising flow guide means provided between a fuel burner and an air inlet for altering the flow path of combustion air entering at the air inlet to result in a better mixing between the fuel and the combustion air, thereby, producing higher temperature hot combustion gases which are subsequently received in a reaction chamber where they react with a carbonaceous feedstock to produce carbon black. The reactor increases the carbon black production up to 20 percent. Further, the positioning of the flow guide means stabilizes the flame from the fuel burner to maintain it along the reactor axis, thus, increasing the life of the refractory lining.

WO 2018 165483 A1 (MONOLITH) teaches heating the thermal transfer gas by Joule heating before bringing said gas into contact with a hydrocarbon feedstock using for example heating elements made from graphite or tungsten. The process is low in carbon dioxide emission, however, since the carbon black is produced from a plasma the carbon blacks thus obtained are of low quality and do not match with the specifications for example for rubbers used in tire industry. The patent does not disclose a combination of pre-combustion chamber and choke area.

The following references concern carbon blacks with different particles size distributions obtained from processes using specific furnace reactors:

For example EP 0546008 B1 (CABOT) refers to improved carbon black that is characterized by the following multitude of features: a CTAB value of greater than 155 $m^2/g$, an iodine number of greater than 180 mg/g; an N2 SA value of greater than 160 $m^2/g$; a tint value of greater than 145%; a CDBP value of 90 to 105 cc/100 g; a DBP value of 155 to 140 cc/100 g; a ΔDBP=DBP−CDBP value of 20 to 35 cc/100 g; a ΔD50 value of less than 40 nm; a Dmode of 40 to 65 nm; a ΔD50/Dmode ratio of 0.55 to 0.67; and an ASTM aggregate volume of less than 1376.000 $nm^3$. The carbon black is obtained using a modular, also referred to as "staged", furnace reactor.

Also EP 0608892 B1 (BRIDGESTONE) discloses a specific furnace reactor for making carbon black. The combustion chamber is connected with a Venturi portion which opens conically to the reaction chamber. However, the dimensions of this reactor are different compared to the modified reactor of the present invention. Especially the choke area has a diameter to length ratio larger than 1. The carbon black compositions exhibit ΔD50/Dmode values of 0.61 to 0.79.

According to EP 0792920 A1 (MITSUBISHI) a carbon black showing a ΔD50/Dmode ratio of only 0.47 to 0.53 is obtained using a furnace reactor with long choke (d/I=0.1 to 0.8), but with-out Venturi section.

A very similar teaching is obtained from EP 0982378 A1 (MITSUBISHI), disclosing carbon black with very narrow ASD, but with very small particle sizes of at most 13 nm, which is obtained from a reactor with a very long choke section. The process also requires specific oxygen concentrations at feedstock injection of at most 3 Vol.-%, preferably 0.05 to 1 Vol.-%.

European patent application EP 1529818 A1 (EVONIK) concerns carbon black with an OAN, measured on the beaded carbon black, of less than 120 ml/100 g. A process for the preparation of the carbon black is described, wherein a salt solution is converted into an aerosol and this is then introduced into the carbon black formation zone. US patent application EP 3060609 A1 (ORION) refers to a carbon black composition showing a narrow Aggregate Size Distribution (ASD) characterized by a ΔD50/Dmode value of about 0.58 to about 0.65 and a Relative Span (D90-D10)/D50 of about 0.5 to about 0.8, which is obtainable by means of a modified furnace reactor, which characterized that the combustion chamber and the choke area is connected by a tube of constant diameter.

International patent application WO 2013 015368 A1 (BRIDGESTONE) discloses a carbon black characterized by the standard deviation of the aggregate distribution of the carbon black obtained by a light scattering method. The furnace reactor is characterized by a cylindrical reaction zone.

International application WO 2016 030495 A1 (ORION) relates to a furnace black having a STSA surface area of at 130 $m^2/g$ to 350 $m^2/g$ wherein the ratio of BET surface area to STSA surface area is less than 1.1 if the STSA surface area is in the range of 130 $m^2/g$ to 150 $m^2/g$, the ratio of BET surface area to STSA surface area is less than 1.2 if the STSA surface area is greater than 150 $m^{21}$ to 180 $m^2/g$, the ratio of BET surface area to STSA surface area is less than 1.3 if the STSA surface area is greater than 180 $m^2/g$, and the STSA surface area and the BET surface area are measured according to ASTM D 6556 and to a furnace process wherein the stoichiometric ratio of combustible material to $O_2$ when forming a combustion gas stream is adjusted to obtain a k factor of less than 1.2 and the inert gas concentration in the reactor is increased while limiting the $CO_2$ amount fed to the reactor.

French patent application FR 2653775 A1 (TOKAI CARBON) also relates to a method for producing a carbon black having a BET value of 125 to 162 $m^2/g$ and a ΔD50/Dmode ratio of 0.55 to 0.66.

U.S. Pat. No. 5,254,325 (NIPPON STEEL) discloses a reactor for producing carbon black with a throat for maintaining the hot gas in a piston flow state.

US patent application US 2016 255686 A1 (DIKAN) refers to high structured carbon blacks, methods of synthesis and treatment, and dispersions and inkjet ink formulations prepared therefrom. The carbon black show an OAN greater than or equal to 170 mL/100 g; and STSA ranging from 160 to 220 m2/g.

Japanese patent application JP 2001 240 768 A1 (MITSUBISHI) refers to a carbon black obtained from a furnace reactor with a very long choke area of at least 500 mm for use in paints having an average particle diameter of 16 nm or less, that is after-treated with nitric acid.

OBJECT OF THE INVENTION

Typically, combustible gases as for example natural gas is introduced along with an oxidant as for example oxygen or air into a pre-combustion chamber. The combustion takes place at temperatures of up to 2,700° C. The hot combustion gases thus obtained are introduced into a furnace reactor ("Choke area") and react with hydrocarbons to form carbon black. This process is also low in carbon dioxide formation, but produces carbon blacks of high quality.

Unfortunately, the combustion reaction is accompanied by various side-reactions according to which carbon monoxide and carbon dioxide are formed, which means that a part of the carbon source gets lost, what increases the carbon dioxide emissions of the overall process significantly. Formation of carbon monoxide and carbon dioxide during the combustion process has a disadvantageous effect on products thus obtained, since particularly at high reaction temperatures the carbon blacks show a high porosity which makes them unsuitable for quite a number of applications.

Therefore, it has been one object of the present invention providing on one hand a process which reduces the loss of carbon via formation of gaseous carbon containing products and on the other hand leads to a carbon black quality of low porosity.

Another object of the invention is to provide a process with a carbon quality of varying porosity.

BRIEF DESCRIPTION OF THE INVENTION

A first object of the present invention refers to a process for obtaining a carbon black composition preferably with low porosity, comprising or consisting of the following steps:

(A) subjecting a hydrocarbon raw material into a high temperature combustion gas stream in order to achieve thermochemical decomposition, (B) cooling the reaction gases and (C) recovering of the carbon black thus obtained, wherein said combustion gas stream consists of at least one oxidant and at least one fuel component, (i) at least a part of said oxidant and/or said fuel component is subjected to an electrical pre-heating step before it is introduced into the pre-combustion chamber to form a high temperature combustion gas stream;

(ii) said high-temperature combustion gas stream of step (i) is transferred into a choke area for combustion; and (iii) and the combustion products obtained in step (ii) are transferred into a reaction tunnel including a terminating zone to form carbon black particles to be recovered.

A second object of the present invention concerns a furnace reactor for producing carbon black preferably of low porosity comprising or consisting of the following elements:

(i) a pre-combustion chamber;
(ii) a choke area;
(iii) a reaction tunnel
(iv) a terminating zone;
(v) at least one electrical preheating device, and optionally
(vi) a heat exchanger, wherein (a) the pre-combustion chamber contains inlets for oxidants and fuel components, is capable for producing hot combustion gases and is connected to the choke area;
(b) the choke area contains at least one inlet for the hydrocarbon raw material and is connected to the reaction tunnel;
(c) the reaction zone is capable of forming the carbon black aggregates and is connected to the terminating zone area,
(d) the terminating area contains
  (d1) at least one, preferably two, three, four or a multitude of nozzles for introducing the quenching agent (typically water or other quenching liquids) or
  (d2) is connected to or consist of at least one heat exchanger (e.g. evaporator or quenchboiler), and is capable of cooling the carbon black aggregates, (e) the outlet of the terminating zone can be connected to a heat exchanger capable of transferring at least part of the thermal energy of the carbon black to the oxidant/and or fuel component to warm them up;
(f) said stream of oxidants and/or fuel components is introduced into a pre-heating device, preferably an electric pre-heating device to be heated before being introduced into the pre-combustion chamber; and optionally
(g) at least one additional pre-heating device is present for
  (g1) pre-heating the hydrocarbon material before introduction into the choke area and/or
  (g2) pre-heating the reaction gases after leaving the pre-combustion chamber and before entering the choke area,
(h) preheated reaction gases introduced into the reaction tunnel, and
(i) preheated reaction gases introduced into the area behind the terminating zone.

It has been found that introducing the gaseous oxidants and/or the gaseous fuel components into the pre-combustion chamber after passing a pre-heating device increases the temperature in the pre-combustion chamber significantly and reduces the amount of carbon monoxide that is formed in a side reaction.

A specific embodiment of the invention can be a furnace reactor consisting of a pre-combustion chamber and a reaction tunnel without a choke area.

Preferred Embodiments of the Invention

In a preferred embodiment of the present invention the gaseous oxidants and/or fuel components are warmed up after passing a heat exchanger before entering the pre-combustor.

In another preferred embodiment of the present invention only a part of the oxidant and/or fuel component is subjected to preheating, which means that a stream of preheated oxidant and or preheated fuel component is blended with a stream of oxidant or fuel component showing a lower temperature. Such blending can take place either before or entering the pre-combustion chamber or in the pre-combustion chamber.

In a particular preferred embodiment the oxidant is subjected to preheating and is mixed with a fuel component of lower temperature or vice-versa.

In another preferred embodiment the oxidant is air which is subjected to preheating before blending with a fuel component of lower temperature.

Due to the much lower CO level the carbon black finally obtained from the process shows the desired low porosity. Additional advantages come from the fact that the new plant allows a compact structure and a serious variability of mass transport as well as an improved controllability of the reaction temperature.

For the sake of good order it should be pointed out that the present invention has the intention to produce carbon black of low porosity. However, a skilled person will be able to modify the furnace reactor in a way that it is also possible to obtain carbon blacks of high porosity, for example by enlarging the residence time in the reaction zone or by modifying the quenching conditions.

The process as described above comprises (a) a combustion step;
(b) a reaction step and
(c) a step for terminating the reaction, may be the same as for a conventional process.

Oxidants and Fuel Agents

Specifically, in the combustion step, in order to form a high temperature combustion gas, at least one oxidant and at least one fuel agent will be mixed and burned (this zone is called a combustion zone).

The oxidant is gaseous and may be oxygen, ozone, hydrogen peroxide, nitric acid, nitrogen dioxide or nitrous oxide. In the alternative, an oxidant-containing gas stream may be air, oxygen-depleted or oxygen-enriched air, oxygen, ozone, a gas mixture of hydrogen peroxide and air and/or nitrogen, a gas mixture of nitric acid and air and/or nitrogen, a gas mixture of nitrogen dioxide or nitrous oxide and air and/or nitrogen, and a gas mixture of combustion products of hydrocarbons and oxidants.

Adding nitrogen to the gaseous combustion media is of advantage since this supports the effect of low porosity of the resulting carbon black As the fuel component, which can be liquid, but is preferably gaseous, hydrocarbons, hydrogen, carbon monoxide, natural gas, coal gas, petroleum gas, a petroleum type liquid fuel such as heavy oil, or a coal derived liquid fuel such as creosote oil, fuel oil, wash oil, anthracene oil and crude coal tar may be used.

The combustion zone is desired to be a sufficiently high temperature atmosphere so that the raw material hydrocarbon can be uniformly vaporized and thermochemically decomposed, and therefore the pre-combustion chamber is typically operated at a temperature ranging from about 1,000 to about 2,700° C., preferably from about 1,200 to about 2,200° C. and more preferably from about 1,400 to about 2,000° C. Most preferably said pre-combustion chamber is operated at about 1,900° C., about 2,100° C., about 2,300° C., about 2,400° C., about 2,500° C. or about 2,600° C.

Another condition desired for the combustion zone is to suppress the oxygen concentration in the combustion gas as far as possible. If oxygen is present in the combustion gas, partial combustion of the raw material hydrocarbon is likely to take place in the reaction zone, whereby non-uniformity in the reaction zone is likely to result.

The oxygen concentration in the combustion gas is adjusted by the k-factor. The k-factor is used as an index number to characterize the excess air. It represents the ratio between the amount of air which for stoichiometric combustion is needed and the real amount of air which is used for the combustion. Preferably the k-factor is adjusted from 0.3 to 1.0, more preferably from 0.6 to 0.9, most preferably 0.7 to 0.85. The amount of combustion air is typically about 2,500 to about 40,000 $Nm^3/h$, and more preferably about 8,000 to about 20,000 $Nm^3/h$ and 10,000 to about 15,000 $Nm^3/h$, while its temperature ranges typically from about 300 to 900° C.

The gaseous and liquid or gaseous fuel can be added via one or more burner lances. The liquid fuel can be added through one or more burner lances and can be atomized by pressure, steam, nitrogen or compressed air or any other atomizing agent known to the person skilled in the art. It is also possible using solid fuel components, which can be supplied by one or more metering screws.

Hydrocarbon Raw Material

In the reaction step, a raw material hydrocarbon is introduced into the high temperature combustion gas stream obtained in the combustion step, as it is jetted from a burner provided in parallel with or in a transverse direction to the high temperature combustion stream, whereupon the raw material hydrocarbon is thermochemically decomposed and converted to carbon black (this zone is called a reaction zone). It is common to provide a choke area in the reaction zone in order to improve the reaction efficiency.

The hydrocarbon raw material may be solid, liquid or gaseous. The hydrocarbon raw material may be a mixture of liquid aliphatic or aromatic, saturated or unsaturated hydrocarbons or mixtures thereof, distillates of coal tar or residual oils resulting from the catalytic cracking of petroleum fractions or from the production of olefins by cracking methods. The hydrocarbon raw material can be a mixture of gaseous hydrocarbon raw materials, for example gaseous aliphatic, saturated or unsaturated hydrocarbons, mixtures thereof or natural gas.

Preferably the raw material represents an aromatic hydrocarbon such as anthracene, CTD (Coal Tar Distillate), ECR (Ethylene Cracker Residue) or a petroleum type heavy oil such as FCC oil (fluidized catalytic decomposition residual oil) or heavy cooker gas oil and crude coal tar.

The carbon black raw material may contain renewable carbon black raw material. The carbon black raw material can be a renewable raw material, such as biogas, rapeseed oil, soybean oil, palm oil, and sunflower oil, oils from nuts or olive oil, or coal dust.

Formation of Carbon Black

The invention process is not limited to specific reactor geometry. Rather, it can be adapted to different reactor types and sizes. Usually, the furnace reactor is operated at a temperature ranging from about 1,000 to about 2,500° C., preferably from about 1,200 to about 2,000° C. and more preferably from about 1,400 to about 2,000° C. Most preferably the reactor is operated at about 1,500° C., about 1,600° C., about 1,700° C., about 1,800° C. or 1,900° C.—depending on the temperature in the pre-combustion chamber and other reaction conditions. It is possible to let the hot combustion gases pass another pre-heater before entering the choke area.

By means of the hot combustion gases the raw material is oxidized to form carbon black and carbon monoxide and carbon dioxide and water. Suitable reactor forms are for example disclosed in the previous chapter describing the prior art and thereby are incorporated by reference.

The carbon black raw materials can be injected by means of radial and/or axial lances. The solid carbon black raw material can be dispersed in the carbon black raw material. The liquid carbon black raw material can be atomized by pressure, steam, nitrogen or compressed air.

Choke area and reaction tunnel are forming the so-called reaction zone. The introduction of the raw material hydrocarbon into the reaction zone is preferably carried out so that the raw material is finely sprayed and uniformly dispersed in the furnace so that oil drops of the raw material hydrocarbon can uniformly be vaporized and thermochemically decomposed. As a method for fine spraying, it is effective to employ a method of atomizing by the combustion gas stream. The flow rate of the combustion gas at the position for introduction of the raw material hydrocarbon is preferably at least 250 m/sec, more preferably from 300 to 800 m/sec and most preferably from 450 to 550 m/sec.

Further, in order to uniformly disperse the raw material in the furnace, introduction of the raw material is preferably carried out in such a manner that the raw material hydrocarbon is introduced into the furnace from one nozzle or multiple nozzles, more preferably from 3 to 12 and more particularly from 4 to 16 nozzles.

The aggregate is believed to be formed in such a manner that the raw material hydrocarbon is uniformly vaporized and thermochemically decomposed, whereby nuclei of a precursor will form and mutually collide to one another to fuse and be carbonized to form the aggregate. Accordingly, it is considered to be advisable that the aggregate formation zone is free from a highly turbulent site due to e.g. a change in the flow path such as in a choke area. In the step for terminating the reaction, the high temperature reaction gas is cooled to a level of not higher than 1,200 to 800° C. by e.g. water spray (this zone is called a quench section). In the alternative, quenching can also take place by leading the products to one or more heat exchangers. The cooled carbon black can be recovered by a conventional process, for example, by a process of separating it from the gas by means of e.g. a collecting bag filter. Typically, the temperature at the outlet of the reactor is about 500 to about 1,000° C.

DETAILED DESCRIPTION OF THE PROCESS

More particularly the present invention refers to a process, wherein the reaction is conducted in a furnace reactor comprising at least (a) a pre-combustion chamber;
(b) a choke area;
(c) a reaction tunnel;
(d) a terminating zone,
(e) an electrical preheating device, and optionally
(f) a heat exchanger.

The process in its preferred embodiment(s) is characterized in that (i) at least one oxidant and at least one fuel component are introduced into the pre-combustion chamber, and said chamber is operated at a temperature ranging from about 1,000 to about 2,500° C. to produce a high temperature combustion gas stream that is transferred into the choke area;

(ii) the hydrocarbon raw material is—optionally after being pre-heated to a temperature ranging from about 100 to about 600° C.—introduced into the choke area, which is preferably a cylindrical structure also called "choke area";

(iii) the formation of the carbon black takes place in the reaction tunnel, said tunnel has preferably a length of about 3 to about 20 m and preferably from about 5 to about 15 m and can be shaped as a Venturi;

(iv) the carbon black formed in the reaction tunnel is cooled in the terminating zone, effected by introducing water or any other substance as quenching agent or by means of at least one heat exchanger;

(v) at least a part of the oxidant and/or the fuel component is subjected to pre-heating in a pre-heating device before being introduced into the pre-combustion chamber, said pre-heating device being preferably an electric pre-heating device which is preferably operated at a temperature ranging from about 200 to about 2,400° C. releasing the pre-heated oxidant and or fuel component with a temperature from about 300 to about 1,300° C., and preferably from about 1,100 to about 1,200° C.;

(vi) at least part of the oxidant and/or fuel component is warmed up by transferring thermal energy from the same or another industrial process by means of a heat exchanger before subjected to pre-heating in the pre-heating device.

Heat exchange may take place using any industrial stream, but preferably said at least part of the gas streams send to the precombustor is warmed up by transferring thermal energy from the hot carbon black leaving the terminating zone by means of a heat exchanger. By this means the stream is warmed up to a temperature ranging from about 650 to about 950° C. before entering the pre-heating device.

Basically, any pre-heating device that is capable of heating any of the process' streams within a reasonable time on temperatures to at least 1,000° C. is suitable to be used in the process of the invention. Particular useful are powder-metallurgical heating systems arranged in ceramic tubes, since they support the combustion reach the required operating temperatures of at least 2,000 up to 2,400° C. Such pre-heating devices based on tube bundle heating elements are for example disclosed in HEAT TREATMENT, p-49-51 (2016).

Since in many plants more electrical energy is produced than consumed the use of electric pre-heating devices is particularly preferred.

Figure 2:
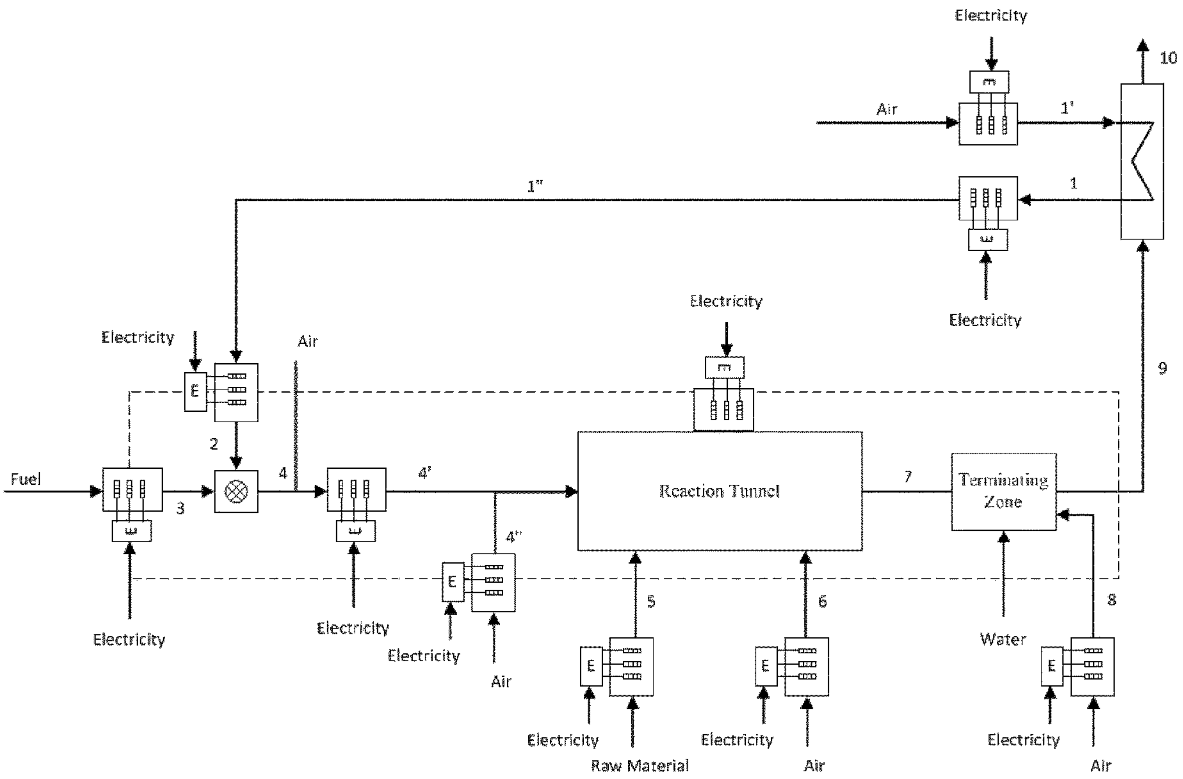

The process is in more detail described in the drawings. FIG. 1 depicts the process as described above, while FIG. 2 shows an alternative including more than one preheating devices. One preferable embodiment consist of an additional preheating device to be used to pre-heat oxidants introduced into the reaction tunnel Another preferable embodiment consists of an additional preheating device to preheat reaction gases introduced into the area behind the terminating zone.

Another preferable embodiment consists of an additional preheating device to be used to pre-heat raw material introduced into the reactor.

Carbon Black and its Industrial Application

Another object of the present invention is a carbon black composition obtained or obtainable according to the process as described above, preferably when obtained from a furnace reactor also disclosed above. Porosity is expressed as the relation between BET surface area to STSA surface area of the carbon black. The carbon black obtainable or obtained according to the present invention is characterized by a STSA surface area of 130 $m^2/g$ to 350 $m^2/g$ wherein the ratio of BET surface area to STSA surface area is less than 1.1 and preferably less than 1.0 and more preferably less than 0.9 if the STSA surface area is in the range of 130 $m^2/g$ to 150 $m^2/g$, the ratio of BET surface area to STSA surface area is less than 1.2, preferably less than 1.1 and more preferably less than 1.0 if the STSA surface area is greater than 150 $m^2/g$ to 180 $m^2/g$, the ratio of BET surface area to STSA surface area is less than 1.3, preferably less than 1.2 and more preferably less than 1.0 if the STSA surface area is greater than 180 $m^2/g$; and the content of volatiles is less than 5 wt.-percent, provided that the STSA surface area and the BET surface area are measured according to ASTM D 6556.

Another object of the present invention refers to the use of the new carbon black as an additive for pigments, polymers, particularly rubbers and tires.

Pigment Applications

Another object of the present invention refers to use of the new carbon black composition as a pigment, in particular as a black pigment for various purposes such as paints and lacquers.

Carbon black represents the ideal black pigment because it is lightfast, resistant to chemical attack and shows a deep black color that makes it superior to other inorganic pigments, such as iron oxides. It is mainly used for two applications, pure black coatings, for which the jetness is the dominating parameter, and gray coatings and paints, for which the tinting strength is more important. The first category includes carbon black pigments mainly with small primary particle sizes, and the second one with medium to large particle sizes. The primary purpose of black and gray coatings is decoration and protection. In black coatings, i.e. mass tone coloration, the fine particle size blacks show a bluish undertone whereas coarse blacks exhibit a brownish undertone. Deep black coatings are predominantly demanded from the automobile and furniture industry. However, carbon blacks which exhibit a pronounced blue undertone are even more requested. This is due to the fact that a bluish black is seen to be darker than one with a brownish undertone. Up to now this could be only fulfilled by producing carbon blacks with ever more smaller sizes. Because aggregates are the smallest dispersible units the ASD also has an impact on the jetness (blackness) and particularly on the undertone (more bluish). The more narrow the ASD in particular the more symmetrical the ASD the less the amount of coarse particles (aggregates) and hence the more bluish the undertone.

As black pigments for deep colouring of plastics mainly carbon blacks of the high colour (HC) and medium colour (MC) class are used. These blacks are found in a great variety of end products such as panelling, casings, fibbers, sheeting, footwear etc., many of them being injection moulded articles. To increase the jetness of a polymer as determined by the blackness $M_y$, one can use a carbon black with smaller sizes of primary particles, low structure blacks or increase the carbon black concentration. Using the first two options the dispersion of the carbon blacks becomes more difficult and can lead to the opposite effect. The concentration of carbon blacks in polymers can be increased only to a certain amount in practice because the mechanical properties of many plastics are usually adversely affected at higher concentrations. Carbon blacks offering a narrow in particular a more symmetrical ASD lead to a higher jetness in polymers without worsen the mechanical properties or decreasing the dispersion behaviour.

In inkjet ink application the trend is towards smaller droplets, which requires print-head nozzles with diameters of just a few micrometers. Prevention of nozzle clogging and deposits on the print-head are essential to ensure long-term print reliability. Particle fineness (aggregates) of the pigment is one of the key roles to fulfil these requirements in print reliability. Especially few amounts of coarser particles influence the filtration properties as well as the printability of final pigmented inkjet inks. The more narrow the ASD the less the amount of coarse particles (aggregates) and hence the lower risk of print unreliability.

The carbon black may be present in said pigment compositions in amounts of from about 0.3 to about 45% b.w., preferably about 1 to about 25% b.w.

Additives for Polymer Compositions

Although a polymer comprising the low porous carbon blacks according to the present invention may encompass a variety of different types, such as polyethylene, polypropylene, polystyrene, polyesters, polyurethanes and the like, the preferred polymer is a synthetic or natural rubber.

Natural rubber, coming from latex of *Havea brasiliensis*, is mainly poly-cis-isoprene containing traces of impurities like protein, dirt etc. Although it exhibits many excellent properties in terms of mechanical performance, natural rubber is often inferior to certain synthetic rubbers, especially with respect to its thermal stability and its compatibility with petroleum products.

Synthetic rubber is made by the polymerization of a variety of petroleum-based precursors called monomers. The most prevalent synthetic rubbers are styrene-butadiene rubbers (SBR) derived from the copolymerization of styrene and 1,3-butadiene. Other synthetic rubbers are prepared from isoprene (2-methyl-1,3-butadiene), chloroprene (2-chloro-1,3-butadiene), and isobutylene (methylpropene) with a small percentage of isoprene for-cross-linking. These and other monomers can be mixed in various proportions to be copolymerized to produce products with a wide range of physical, mechanical, and chemical properties. The monomers can be produced pure and the addition of impurities or additives can be controlled by design to give optimal properties. Polymerization of pure monomers can be better controlled to give a desired proportion of cis and trans double bonds. With respect to polymers of the synthetic or natural rubber type, another object of the present invention is a method for improving wear resistance and reinforcement, and of such polymer compositions.

The invention also encompasses the use of such carbon black compositions for achieving said effect when added to a rubber composition. The amounts of carbon black to be added to a polymer in general and particularly to a rubber ranges from about 10 to about 120 phr[1], preferably about 35 to about 100 phr and more preferably about 40 to 60 phr.

[1]phr=parts per hundred parts rubber

Polymer Compositions, Rubber Compositions and Final Products

The polymers incorporating the carbon blacks according to the present invention may be selected from the group consisting of polyethylene, polypropylene, polystyrene, polyesters, polyurethanes, but preferably the polymer is either a synthetic or natural rubber. The carbon black may be present in said compositions in amounts of from about 0.3 to about 45% b.w., preferably about 1 to about 25% b.w.

In case, the polymer composition is a rubber composition that is designated to deal as a basis for tires, such compositions generally comprise elastomer compositions, reinforcing to fillers and partly silane coupling agents. The compositions may be cured using a sulphur vulcanizing agent and various processing aids, including accelerators.

Rubbers

Any conventionally used rubber compounding elastomer is potentially suitable for the rubber compositions covered by the present invention. Non-limiting examples of elastomers potentially useful in the exemplary composition include the following, individually as well as in combination, according to the desired final viscoelastic properties of the rubber compound: natural rubber, polyisoprene rubber, styrene butadiene rubber, polybutadiene rubber, butyl rubbers, halobutyl rubbers, ethylene propylene rubbers, cross linked polyethylene, neoprenes, nitrile rubbers, chlorinated polyethylene rubbers, silicone rubbers, specialty heat and oil resistant rubbers, other specialty rubbers, and thermoplastic rubbers, as such terms are employed in The Vanderbilt Rubber Handbook, Thirteenth Edition, (1990). These elastomers may contain a variety of functional groups, including, but not limited to tin, silicon, and amine containing functional groups.

The ratios of such polymer blends can range across the broadest possible range according to the final viscoelastic properties desired for the polymerized rubber compound. One skilled in the art, without undue experimentation, can readily determine which elastomers and in what relative amounts are appropriate for a resulting desired viscoelastic property range. The rubber compositions may include

- liquid hydroxyl terminated polyalkylenes;
- halogenated co-polymers of isobutylene and p-methylstyrene, or both;
- EPDM-based rubbers;
- halogenated co-polymers of isoolefin and para-alkylstyrene;
- styrene-butadiene rubbers, including high trans styrene-butadiene rubbers and/or
- high vinyl polybutadiene elastomers.

Reinforcing Fillers

Typically, the rubber compositions are compounded with reinforcing fillers, including carbon black and silica. The carbon black may be present in amounts ranging from about 10 to about 120 phr, or from about 35 to about 100 phr or from about 40 to about 60 phr. The carbon blacks may be in pelletized form or an unpelletized flocculent mass.

Examples of suitable silica reinforcing fillers include, but are not limited to, hydrated amorphous silica, precipitated amorphous silica, wet silica (hydrated silicic acid), dry silica (anhydrous silicic acid), fumed silica, calcium silicate, and the like.

Rubber Compounding Components

Processing Aids.

The rubber composition may be compounded by, for example, mixing the various sulphur-vulcanizable constituent rubbers with various commonly used additive materials such as, for example, curing aids such as sulphur, activators, retarders, and accelerators, processing additives, such as oils, resins including tackifying resins, silicas, and plasticizers, fillers, pigments, fatty acid, zinc oxide, waxes, antioxidants and antiozonants, peptizing agents, and reinforcing materials such as, for example, carbon black.

An amount of processing aids may be from about 0 to about 10 phr. Such processing aids may include, for example, aromatic, naphthenic, and/or paraffinic processing oils. Typical amounts of antioxidants may comprise from about 1 to about 5 phr. Representative antioxidants may be, for example, diphenyl-p-phenylenediamine, TMQ, and others such as, for example, those disclosed in The Vanderbilt Rubber Handbook (1978), pages 344-346. Typical amounts of antiozonants, such as N-(1,3-dimethylbutyl)-N'-phenyl-1,4-benzene diamine (6PPD), may comprise from about 1 to 5 phr. Typical amounts of fatty acids, if used, which can include stearic acid, may comprise from about 0.5 to about 3 phr. Typical amounts of zinc oxide may comprise from about 1 to about 5 phr. Typical amounts of waxes may comprise from about 1 to about 5 phr. Often microcrystalline waxes are used. Typical amounts of peptizers may comprise from about 0.1 to about 1 phr. Typical peptizers may be, for example, pentachlorothiophenol and dibenzamidodiphenyl disulphide. Process aids, such as phenolic resin (about 2 phr) and C5 aliphatic HC resin (about 5 phr) (tackifiers) may also be useful.

Vulcanization Agents.

The vulcanization may be conducted in the presence of a sulphur vulcanizing agent. Examples of suitable sulphur vulcanizing agents include elemental sulphur (free sulphur) or sulphur donating vulcanizing agents, for example, an amine disulphide, polymeric polysulphide, or sulphur olefin adducts. Sulphur vulcanizing agents may be used in an amount ranging from about 0.5 to about 8 phr.

Accelerators.

Accelerators are used to control the time and/or temperature required for vulcanization and to improve the properties of the vulcanizate. In one embodiment, a single accelerator system may be used, i.e., a primary accelerator. A primary accelerator is used in total amounts ranging from about 0.5 to about 4 phr. In another embodiment, combinations of a primary and a secondary accelerator might be used with the secondary accelerator being used in smaller amounts (of about 0.05 to about 3 phr) in order to activate and to improve the properties of the vulcanizate. In addition, delayed action accelerators may be used which are not affected by normal processing temperatures, but produce a satisfactory cure at ordinary vulcanization temperatures. Vulcanization retarders might also be used. Suitable types of accelerators that may be used are amines, disulphides, guanidines, thioureas, thiurams, sulphonamides, dithiocarbamates, xanthates, and sulphenamides. The primary accelerator may also be a thiazole, such as a benzothiazole-based accelerator. Exemplary benzothiazole-based accelerators may include N-cyclohexyl-2-benzothiazole sulphonamide (CBS), N-tert-butyl-2-benzothiazole sulphenamide (TBBS), 4-oxydiethylene-2-benzothiazole sulphenamide (OBTS), N,N'-dicyclohexyl-2-benzothiazole sulphenamide (OCBS), 2-mercaptobenzothiazole (MBT), and dibenzothiazole disulphide (MBTS), and may be present in an amount of from about 0.8 to about 1.2 phr. In one embodiment, the amount of the benzothiazole accelerator may be from about 30 to about 60% b.w. of the sulphur vulcanizing agent.

Pneumatic Tires

A final object of the present invention is directed to a pneumatic tire comprising the new carbon black composition or a rubber composition that comprises said carbon black composition as an additive. Preferably, said tire is a bus tire or a truck tire.

The pneumatic tire according to an embodiment of the invention shows improved wear resistance and low heat build-up by using the aforementioned carbon black compositions and/or rubber compositions comprising said carbon black compositions for the tire tread in a tread portion. Moreover, the pneumatic tire according to this embodiment has a conventionally known structure and is not particularly limited, and can be manufactured by the usual method. Also, as a gas filled in the pneumatic tire according to the embodiment can be used air or air having an adjusted oxygen partial pressure but also an inert gas such as nitrogen, argon, helium or the like.

As an example of the pneumatic tire is preferably mentioned a pneumatic tire comprising a pair of bead portions, a carcass torpidly extending between the bead portions, a belt hooping a crown portion of the carcass and a tread, or the like. The pneumatic tire according to the embodiment of the invention may have a radial structure or a bias structure.

The structure of the tread is not particularly limited, and may have a one layer structure or a multi-layer structure or a so-called cap-base structure constituted with an upper-layer cap portion directly contacting with a road surface and a lower-layer base portion arranged adjacent to the inner side of the cap portion in the pneumatic tire. In this embodiment, it is preferable to form at least the cap portion with the rubber composition according to the embodiment of the invention. The pneumatic tire according to the embodiment is not particularly limited in the manufacturing method and can be manufactured, for example, as follows. That is, the rubber composition according to the above embodiment is first prepared, and the resulting rubber composition attached onto an uncured base portion previously attached to a crown portion of a casing in a green pneumatic tire, and then vulcanization-built in a given mould under predetermined temperature and pressure.

The invention claimed is:

1. A process for obtaining a carbon black composition comprising the following steps:

(A) subjecting a hydrocarbon raw material into a combustion gas stream in order to achieve thermochemical decomposition, (B) cooling the reaction gases, and (C) recovering of the carbon black thus obtained, wherein said combustion gas stream consists of at least one oxidant and at least one fuel component, (i) wherein at least a part of said oxidant and at least a part of said fuel component are subjected to a powder-metallurgical electric pre-heating device arranged in ceramic tubes with an operating temperature of at least 2000° C. and up to 2400° C. so as to heat said oxidant and said fuel component to a temperature of from about 1,100 to about 1,300° C. as it is introduced into a pre-combustion chamber to form said combustion gas stream;

(ii) wherein said combustion gas stream of step (i) is transferred into a choke area for combustion; and (iii) wherein the combustion products obtained in step (ii) are transferred into a reaction tunnel including a terminating zone to form carbon black particles to be recovered wherein wherein the carbon black obtained in step (C) has (iv) a STSA surface area greater than 180 $m^2/g$, (v) a ratio of BET surface area to STSA surface area of less than 1.3, and (vi) volatiles content of less than 5 wt. percent; with the proviso that the STSA surface area and the BET surface area are measured according to ASTM D 6556.

2. The process of claim 1, wherein said oxidants are gaseous components selected from the group consisting of oxygen, ozone, hydrogen peroxide, nitric acid, nitrogen dioxide or nitrous oxide or oxidant-containing gas stream encompassing air, oxygen-depleted or oxygen enriched air, oxygen, ozone, a gas mixture of hydrogen peroxide and air and/or nitrogen, a gas mixture of nitric acid and air and/or nitrogen, a gas mixture of nitrogen dioxide or nitrous oxide and air and/or nitrogen, and a gas mixture of combustion products of hydrocarbons and oxidants.

3. The process of claim 1, wherein said fuel components are gaseous components selected from the group consisting of hydrocarbon, hydrogen, carbon monoxide, natural gas, coal gas, petroleum gas, heavy oil and creosote oil.

4. The process of claim 1, wherein said hydrocarbon raw material is selected from the group consisting of anthracene, CTD (Coal Tar Distillate), ECR (Ethylene Cracker Residue) and FCC oil (fluidized catalytic decomposition residual oil) which also can be preheated electrically.

5. The process of claim 1, wherein the process is conducted in a furnace reactor comprising at least (a) a pre-combustion chamber;

(b) a choke area;

(c) a reaction tunnel;

(d) a terminating zone; and (e) at least one electrical preheating device.

6. The process of claim 5, wherein the furnace reactor further comprises a heat exchanger.

7. The process of claim 1, wherein the oxidant and the fuel component are introduced into the pre-combustion chamber, and said chamber is operated at a temperature ranging from about 1,000 to about 2,500° C. to produce the combustion gas stream.

8. The process of claim 1, wherein the formation of the carbon black takes place in the reaction tunnel.

9. The process of claim 1, wherein the carbon black formed in the reaction tunnel is cooled in the terminating zone, effected by introducing water as quenching agent or by means of at least one heat exchanger.

10. The process of claim 1, wherein said at least a part of the oxidant and at least a part of the fuel component prior to step C (i) are warmed up by transferring thermal energy from the same or another industrial process by means of a heat exchanger.

11. The process of claim 10, wherein said at least a part of the oxidant and at least a part of the fuel component prior to the pre-heating in the pre-heating device are warmed up by transferring thermal energy from the combustion gas stream leaving the terminating zone by means of a heat exchanger.

12. The process of claim 11, wherein the combustion gas stream consists of carbon black and tail gas.

13. A furnace reactor for producing carbon black according to the process of claim 1, wherein the furnace reactor comprises:

(i) a pre-combustion chamber;

(ii) a choke area;

(iii) a reaction tunnel;

(iv) a terminating zone; and (v) at least one electrical preheating device, wherein (a) the pre-combustion chamber contains inlets for oxidants and fuel components, is capable for producing hot combustion gases and is connected to the choke area;

(b) the choke area contains at least one inlet for the hydrocarbon raw material and is connected to the reaction tunnel;

(c) the reaction zone is capable of forming the carbon black aggregates and is connected to the terminating zone, (d) the terminating zone contains (d1) at least one nozzle for introducing the quenching agent or (d2) is connected to at least one heat exchanger, and is capable of cooling the carbon black aggregates, (e) the outlet of the terminating zone is connected with a heat exchanger capable of transferring at least part of the thermal energy of the carbon black to the oxidant/and or fuel component to warm them up;

(f) said warmed stream of oxidants and fuel components are introduced into a powder-metallurgical electric preheating device arranged in ceramic tubes with an operating temperature of at least 2000° C. and up to 2400° C. to be heated before being introduced into the pre-combustion chamber; and optionally (g) at least one additional pre-heating device is present for pre-heating (g1) the hydrocarbon material before introduction into the choke area and/or (g2) the reaction gases after leaving the pre-combustion chamber and before entering the terminating zone;

(h) preheated reaction gases introduced into the reaction tunnel, and (i) preheated reaction gases introduced into the area behind the terminating zone.

14. The furnace reactor of claim 13, wherein the furnace reactor further comprises a heat exchanger.

15. The furnace reactor of claim 13, wherein the terminating zone contains a multitude of nozzles.

* * * * *